United States Patent
Kong et al.

(10) Patent No.: US 10,701,028 B2
(45) Date of Patent: Jun. 30, 2020

(54) TERMINAL IDENTIFICATION METHOD AND APPARATUS THEREFOR

(71) Applicant: SOOSAN INT CO., LTD., Seoul (KR)

(72) Inventors: Kyoung Pil Kong, Seoul (KR); Yong Hwan Lee, Seoul (KR); Min Woo Nam, Seoul (KR); Kyoung Tae Kang, Seoul (KR)

(73) Assignee: SOOSAN INT CO., LTD., Seoul (KR)

( * ) Notice: Subject to any disclaimer, the term of this patent is extended or adjusted under 35 U.S.C. 154(b) by 166 days.

(21) Appl. No.: 15/779,409

(22) PCT Filed: Oct. 7, 2016

(86) PCT No.: PCT/KR2016/011235
§ 371 (c)(1),
(2) Date: May 25, 2018

(87) PCT Pub. No.: WO2017/090883
PCT Pub. Date: Jun. 1, 2017

(65) Prior Publication Data
US 2018/0351905 A1    Dec. 6, 2018

(30) Foreign Application Priority Data
Nov. 27, 2015    (KR) .......................... 10-2015-0167509

(51) Int. Cl.
*H04L 29/12* (2006.01)
*G06K 9/46* (2006.01)
(Continued)

(52) U.S. Cl.
CPC ............ *H04L 61/2007* (2013.01); *G06K 9/18* (2013.01); *G06K 9/46* (2013.01); *H04L 61/2503* (2013.01);
(Continued)

(58) Field of Classification Search
CPC ............ H04L 61/2007; H04L 61/2503; H04L 61/2514; H04L 67/1095; H04L 67/303; G06K 9/18; G06K 9/46
See application file for complete search history.

(56) References Cited

U.S. PATENT DOCUMENTS

2008/0077855 A1 *   3/2008   Lev ..................... G06F 16/9577
                                                      715/236
2008/0189360 A1 *   8/2008   Kiley .................... H04L 67/306
                                                      709/203
(Continued)

FOREIGN PATENT DOCUMENTS

KR    20010097850 B1    11/2001
KR    20070018242 A      2/2007
(Continued)

OTHER PUBLICATIONS

International Search Report and Written Opinion of PCT/KR2016/011235 dated Jan. 11, 2017, 12 pages.
(Continued)

*Primary Examiner* — Wing F Chan
*Assistant Examiner* — Billy H Ng
(74) *Attorney, Agent, or Firm* — Kilpatrick Townsend & Stockton LLP (57) ABSTRACT

Provided are a terminal identification method and an apparatus therefore. A terminal identification apparatus obtains pixel data for a certain region of a screen displayed on the terminal, generates mapping codes for the pixel data, and then identifies the number of mapping codes for each public IP address or for each user identification information that is different from one another.

11 Claims, 7 Drawing Sheets

(51) Int. Cl.
*G06K 9/18* (2006.01)
*H04L 29/08* (2006.01)

(52) U.S. Cl.
CPC ...... *H04L 61/2514* (2013.01); *H04L 67/1095* (2013.01); *H04L 67/303* (2013.01)

(56) References Cited

U.S. PATENT DOCUMENTS

| | | | |
|---|---|---|---|
| 2010/0027896 A1* | 2/2010 | Geva | G06F 11/3414 |
| | | | 382/229 |
| 2014/0298449 A1* | 10/2014 | Low | G06F 3/01 |
| | | | 726/19 |
| 2015/0188977 A1* | 7/2015 | Berry | G06T 7/0002 |
| | | | 709/217 |
| 2016/0050179 A1* | 2/2016 | Wang | H04L 65/1066 |
| | | | 726/12 |

FOREIGN PATENT DOCUMENTS

| | | |
|---|---|---|
| KR | 101061189 B1 | 8/2011 |
| KR | 101558652 A | 12/2014 |
| KR | 20150084721 A | 7/2015 |
| WO | 2017090883 A1 | 6/2017 |

OTHER PUBLICATIONS

Korean NOA from KR App. No. 10-2015-0167509, no English translation available, dated Feb. 2, 2017, 3 pages.
Korean OA from KR App. No. 10-2015-0167509, no English translation available, dated Aug. 11 or Oct. 11, 2016, 6 pages.

* cited by examiner

```
iVBORw0KGgoAAAANSUhEUgAAArwAAAK8CAYAAAANumxDAAAAA
XNSR0IArs4c6QAAAARnQU1BAACxjwv8YQUAACHVSURBVHhe7d0JIF
1VmS/wXSEhMxkgARKGkACPIITgI8yiIK1MCgiiMixbMQIPbbWbJ64nTa
ON0C0OT18cGaTRB2LboIAikwyKDELC3AQIZCATIfMcCEnuO9+ue4qby
q1UJRBI4Pdba3PPfM69ieL+67v77NtQGZEqaRM1jEkN1UkAANgitas+A
gDAu5IK7zto0ujKJr/2sDUYNLLB/yMAeMep8PKuM+jRMeuOWrXzzde1
Vb1j1mvN1Vu2KTb1OG/3fgCwpVDhfQep8L49IrBN+p8jNjhdainc1W5
Xb796mm+3MfuV6m1f77qtae38bdm33n5tpclLwJZgowLvIen/pBmpZ
5qZvpHn1wm8I0YdVixSsDpXo3JhGnPeZdWZN+Tt0w3Fuv7V+ZnFf08
v5h/K87XyuoZ+1bk3VNJVaezIL+fp4aMfLv47rml+Uwwf/ZPiGX2pOre+
2vNtijh+SsOKYxwSs29X4H18+Svp9Od+n27Y5+R0YNcdq0vb5qYFL6T
zp9y73r7nTboz/WnR1PWC0CeevSn13bZLGjXo

FIG. 6

```
iVBORw0KGgoAAAANSUhEUgAAArwAAAK8CAYAAAANumxDAAAAA
XNSR0IArs4c6QAAAARnQU1BAACxjwv8YQUAACHYSURBVHhe7d0JlF
1VmS/wXSEhMxkgARKGQIBHEELwESCAKEjLqIAgKsOyFZOwIFa7eeJa0j
TaCK04PEFxZZBGH4hti4KlTDIoMggJcxMgkIFMhMwjgZDUfefbdU9xU9
xKVcKUw0+31uae+ZxbleL+73f32behMqpPJW2khnGLG6qTAACwSep
QfQQAgPckFd530ZSxIY3+2cPmYPDoBv+PAOBdp8LLe87gh8et02rVzr
dc1171jImvtVRv2cbY2OO80/sBwKZChfddpML7zojANuV/j1rvdKm1cF
e7Xb396mm53Ybsv6q3fb3jtqat87dn33r7tZcKLwCbggOKvAemc9KstF
WanS7J8+sE3lFjRhRL7q/O1aicn8ad3bRDrbx9uq5YN7A6P7v47ynF/AN
5vlZe1zCqOve6SroijR99Tp4eOfbB4r8Tmuc3xsixPOON6cvVuTeqPd/GiO
OnNLw4xoEx+04F3kdXvpROeeYP6bo9T0j7dd+2urR9bljOXDp32t1v2Pf
sKbenPy+Z/oYg9Mmnnb0j9t+yWxgz+WHVJfT+b+2i6Zv5T6f59zsjzcbz
Q1n4b4ne7fSl/3mkhfTR3junk5+/sTm8xbrzfnN883TturbUHiP2K5XnK9
WeN7S2X62W11Dvmloep942obVjtXb+to5TD7/4Pd6x+1X0+yEnVpesS
+AFYFPw1nRpyGGzCLvjRjes01LlzGL5xdUw29LhRYB8KE81hd9UN+w2i
+Dc4vgRTkeN+WZ1gzcvwmx57FQ5uGlh8VguezNhdzN1Yt/d07ZFgH
1g+ZzqkiZPvDwvL4/AU+vxYvnRfXapzr17qRFol32swWP56DWMpcuT
2xbr7Wm9nwbe96WgTP2u/TTN6UvbbNvdcn6tV5ntKOOuqJ5ui0tt69t
6/Ol7bLb3C+NeO+6hIA2PRsVOC9b5Sq9MsPr2yaxWG3Mqcp1KZ201g
NpyMgJ6Y+5jTz70yNHHjr7puON/1G31j05/Pm9fqkTFtmF2bH/KyRd9r5if
FYtHTUhXxbkK8TQuxvynYRTvpkxdPL4799VETX6/Kjp6yFrj/uGMfITyPHXF
9d1BSoR42tfI9N5CR4zPPVIIR5bRbHO+PMr38/AkA81p4z2idu2u0H6
9s/n7t5/RsD+bCfnTB9xFVHViLgtBUUDn7ymhyEokwItlZURct1OdqyOut
z6brdPp5+88qtefvYP45ZTpePLQ3t1j391+P2vO+Czk83X8cZ/T6QZux8
WV/4eoholTfvcO6cpe/9x8bdHKcByPP5w9lb2O+uV0lKR6ZqBn8nL
wwPbfye3q8THPuW5an8OOepdZynWR3AsW0uxPqqvYYmQF0G1Xqun
5flaO++GqL2G2277cpvBs1R7rbfFPLZHy+3LY7ko/9Hb7Zse2OoX+Xde
+++pWfwNNP0tNP39AcA77M1VeMsXsPFnnxQPH/vtfo/OmjN00vjXY
48fP27sCO4rH4/Ll2194147znN4INsiG3pMDcrz4RXW2aH+954uTpk7d/
0PF9AF9vnFBTjdXJkhPx2M9wQVfO354++ni06393/+9MdzI1cq6eghQ
+7ZurpJOzRcXSTuMm5jnU2V4uYX43H7pyuuufr7X48A8PijH7siJWuSefl
844fc8mNNN37930b9ozVUTmoCvU3dIg6oHrup

TERMINAL IDENTIFICATION METHOD AND APPARATUS THEREFOR

TECHNICAL FIELD

The present disclosure relates to a method of identifying a terminal and an apparatus therefore, and more particularly, to a method of identifying a terminal within a private network and an apparatus therefore.

BACKGROUND ART

In general, a public Internet Protocol (IP) address is assigned to each terminal accessing the Internet, and thus, each terminal may be identified based on the public IP address. However, not the public IP address but a private IP address assigned by a sharer is assigned to each terminal of a private network sharing one public IP address via the sharer. Accordingly, other servers or terminals outside the private network may know only the public IP address of the sharer but not the private IP address of a terminal within the private network, and thus, may not identify the terminal within the private network.

Thus, according to the related art, a method of storing, in a terminal, cookies including information for making a distinction between terminals to identify each terminal within the private network is proposed. However, cookies may be not only arbitrarily deleted by a user but also forged, and accordingly, accurate terminal identification has limits.

DESCRIPTION OF EMBODIMENTS

Technical Problem

Provided is a method of easily identifying each terminal within a private network, to which a public Internet Protocol (IP) address is not assigned, and an apparatus therefore.

Solution to Problem

According to an aspect of the present disclosure, a terminal identification method by a terminal identification apparatus includes: obtaining pixel data for an area of a screen displayed on a terminal; generating a mapping code for the pixel data; and identifying a number of different mapping codes for each public Internet Protocol (IP) address or for each user identification information.

According to another aspect of the present disclosure, a terminal identification apparatus includes: a receiver obtaining pixel data for an area of a screen displayed on a terminal; a code generator generating a mapping code for the pixel data; and an identifier identifying a number of different mapping codes for each public Internet Protocol (IP) address or for each user identification information.

According to another aspect of the present disclosure, a terminal identification method of a terminal includes: transmitting a request for a web access via a browser; receiving a response message comprising a picture drawing command in response to the request for the web access; extracting pixel data of an image drawn or displayed on an area of a screen according to the picture drawing command; and transmitting the pixel data.

Advantageous Effects of Disclosure

According to the present disclosure, a terminal within a private network sharing one public Internet Protocol (IP) address may be easily identified. In addition, for terminal identification, there is no need to plant extra information, such as cookies, in the terminal, and accordingly, the problem of terminal identification errors caused by deleting cookies according to the related art may be solved.

BRIEF DESCRIPTION OF DRAWINGS

FIGS. 5 and 6 are diagrams showing pixel data of the image for terminal identification of FIG. 2, which is displayed on an area of a screen of each terminal.

MODE OF DISCLOSURE

Hereinafter, a terminal identification method and an apparatus therefore will be described in detail with reference to the accompanying drawings.

Figure 1:
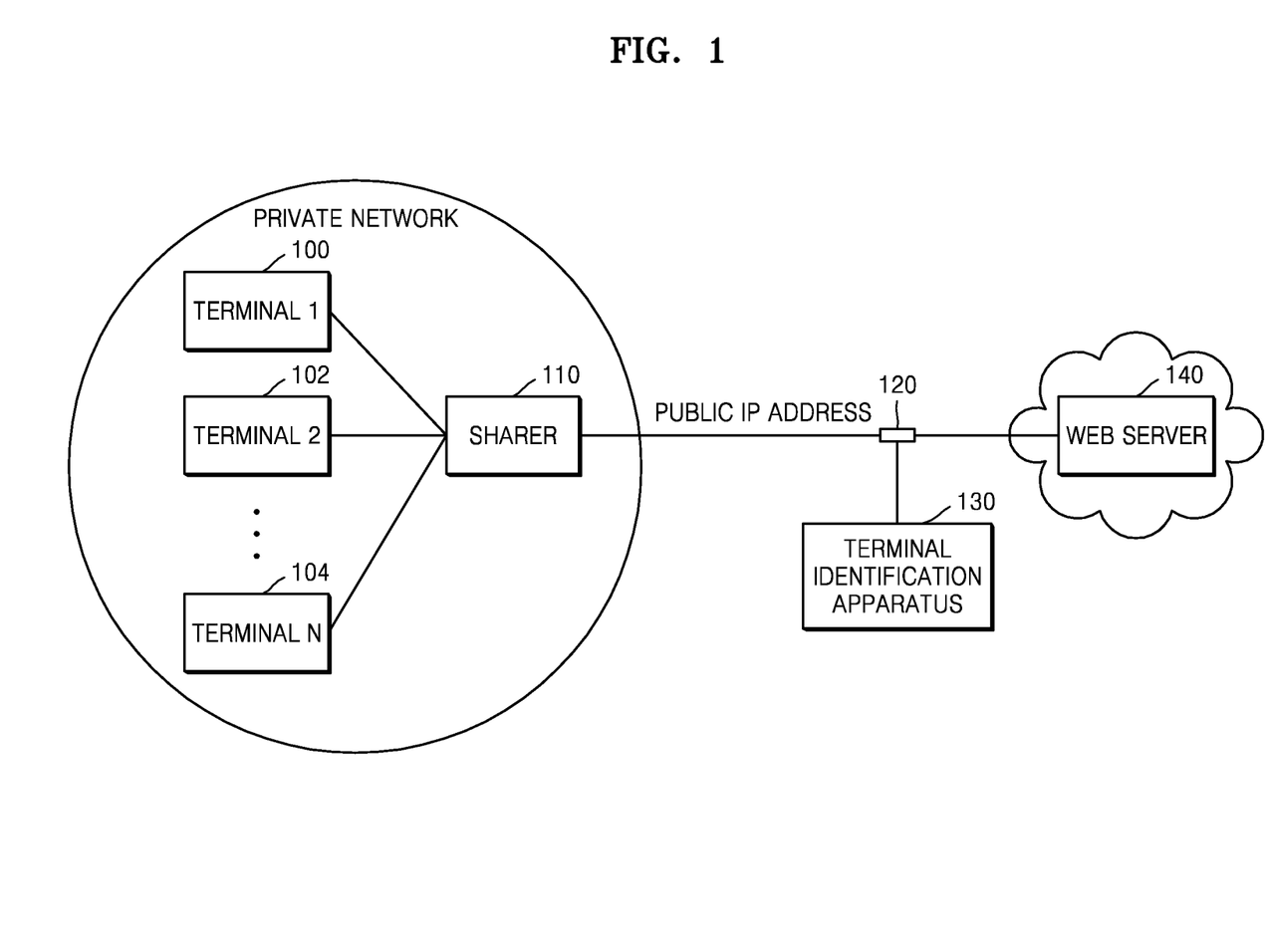
FIG. 1 is a diagram showing a schematic structure of the overall system to which a terminal identification method is applied according to the present disclosure.

FIG. 1 is a diagram showing a schematic structure of the overall system to which a terminal identification method is applied according to the present disclosure.

Referring to FIG. 1, a plurality of terminals 100, 102, and 104 within a private network share one public Internet Protocol (IP) address by using a sharer 110. A private IP address set by the sharer 110 is assigned to each terminal 100, 102, and 104 within the private network formed by the sharer 110.

For example, when the first terminal 100 transmits a packet to a web server 140 outside, the sharer 110 changes a private IP address of the first terminal 100 included in the packet to a public IP address shared by the plurality of terminals and thus transmits the same to the web server 140. Accordingly, the web server 140 may know only the public IP address included in the packet by the sharer 110 of the first terminal 100 but not the private IP address of the first terminal 100.

When the same image is displayed on each terminal 100, 102, and 104, data of some pixels is different from one another (Refer to FIGS. 2 to 7) according to a type of hardware (a graphics card, a monitor, etc.) or a type of software (an operating system, a device driver, a browser, etc.) of each terminal, although not clearly identified with eyes of a user. Despite the same hardware specification or operating system of terminals, when driver versions of the graphics card are different, some pixels of the image displayed on screens may be different.

Thus, a terminal identification apparatus 130 identifies each terminal 100, 102, and 104 by using pixels that are different from one another even when the same image is displayed on each terminal 100, 102, and 104. This will be described in detail with reference to FIG. 2 and further below.

The terminal identification apparatus 130 is connected to the sharer 110 through a mirroring apparatus 120. The mirroring apparatus 120 mirrors a message, etc. transmitted by the sharer 110 and provides the same to the terminal identification apparatus 130. In some embodiments, the terminal identification apparatus 130 may be directly connected to the sharer 110 without the mirroring apparatus 120.

Figure 2:
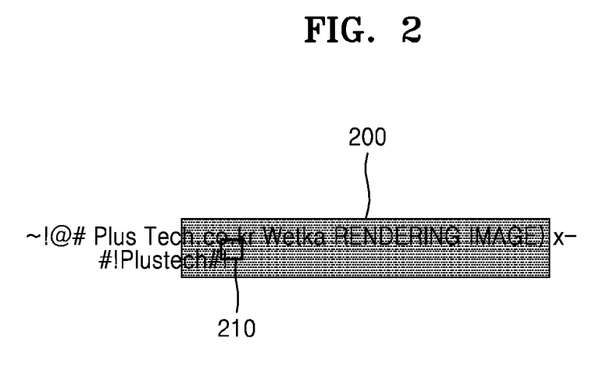
FIG. 2 is a diagram showing an example of an image for terminal identification according to the present disclosure.

FIG. 2 is a diagram showing an example of an image for terminal identification according to the present disclosure.

Referring to FIG. 2, an image 200 may include a symbol or a number, text such as a character, a line or a figure, a color, etc. FIG. 2 shows merely an example of an image for terminal identification, and other various shapes of images may be used.

The image 200 for terminal identification may be drawn by a picture drawing tool. In this regard, the picture drawing tool may be a tool provided by an operating system (for example, Windows operating system, etc.) of a terminal, or a tool such as a canvas provided by a browser (for example, Explorer, Chrome, Firefox, etc.).

The picture drawing tool may draw an image to which various attributes such as a font location, a font size, a font type, a font color, a thickness of a line, a shape or size of a figure, and a figure background color are applied. In the case of an image having various attributes applied rather than an image consisting of simple text, etc., a pixel difference between terminals may be more remarkable, and thus, it is desirable to use an image having at least one attribute applied as the image for terminal identification.

The picture drawing tool may set a transparency degree of the image for terminal identification. For example, when a transparency degree of an image having various attributes applied is set to 100%, corresponding text or image is drawn on the screen but is invisible to the user, and thus, does not cause inconvenience.

As another example, the image for terminal identification may be a portion of an image commonly appearing on screens of terminals. For example, when an icon shape of a browser such as Explorer is common to each terminal, it may be used as the image for terminal identification. In addition, any image that commonly appears on a plurality of terminals may be used as the image for terminal identification, and in this case, a drawing process by a picture drawing tool may be omitted.

Figure 3:
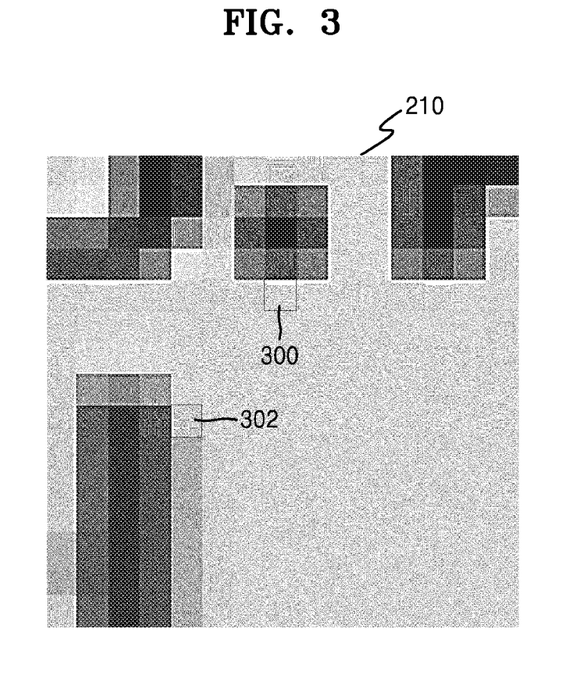
FIGS. 3 and 4 are enlarged views of a portion of the image for terminal identification of FIG. 2.
Figure 4:
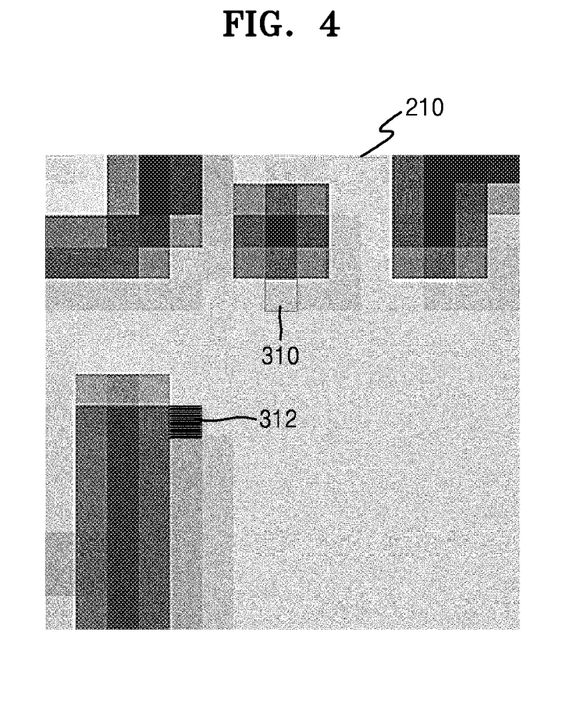

FIGS. 3 and 4 are enlarged views of a portion of the image for terminal identification of FIG. 2. FIGS. 3 and 4 are enlarged views of a portion 210 of the image of FIG. 2 displayed on different terminals, respectively.

Referring to FIGS. 3 and 4, the portion 210 of the image of FIG. 2 is displayed on each screen of terminal A and terminal B. However, referring to enlarged pixels, it may be found out that some pixels 300, 302, 310, and 312 within two images are different.

FIGS. 5 and 6 are diagrams showing pixel data of the image for terminal identification of FIG. 2, which is displayed on an area of a screen of each terminal.

Referring to FIGS. 5 and 6, it may be found out that, when the image 200 of FIG. 2 is displayed on areas of screens of terminal A and terminal B, different values appear on a portion of a character string that pixel data of this image is represented as. This is because, as described above with reference to FIGS. 3 and 4, in spite of the same image, some pixels are different from each other according to a screen of a terminal on which the image is displayed.

Since pixel data of an image displayed on respective screens of terminals is binary data, the pixel data may be converted into an American Standard Code for Information Interchange (ASCII) character string by using Base 64, etc. Although pixel data of a character string may be used as-is and be utilized as identification information of each terminal, the character string is very long and thus causes inconvenience in management, and accordingly, it is desirable to generate a unique mapping code for each character string and manage the unique mapping code. As an example, a hash value for each character string may be utilized as the mapping code. A hash value for the character string of FIG. 5 is "1314178796", and a hash value for the character string of FIG. 6 is "3140109402".

Figure 7:
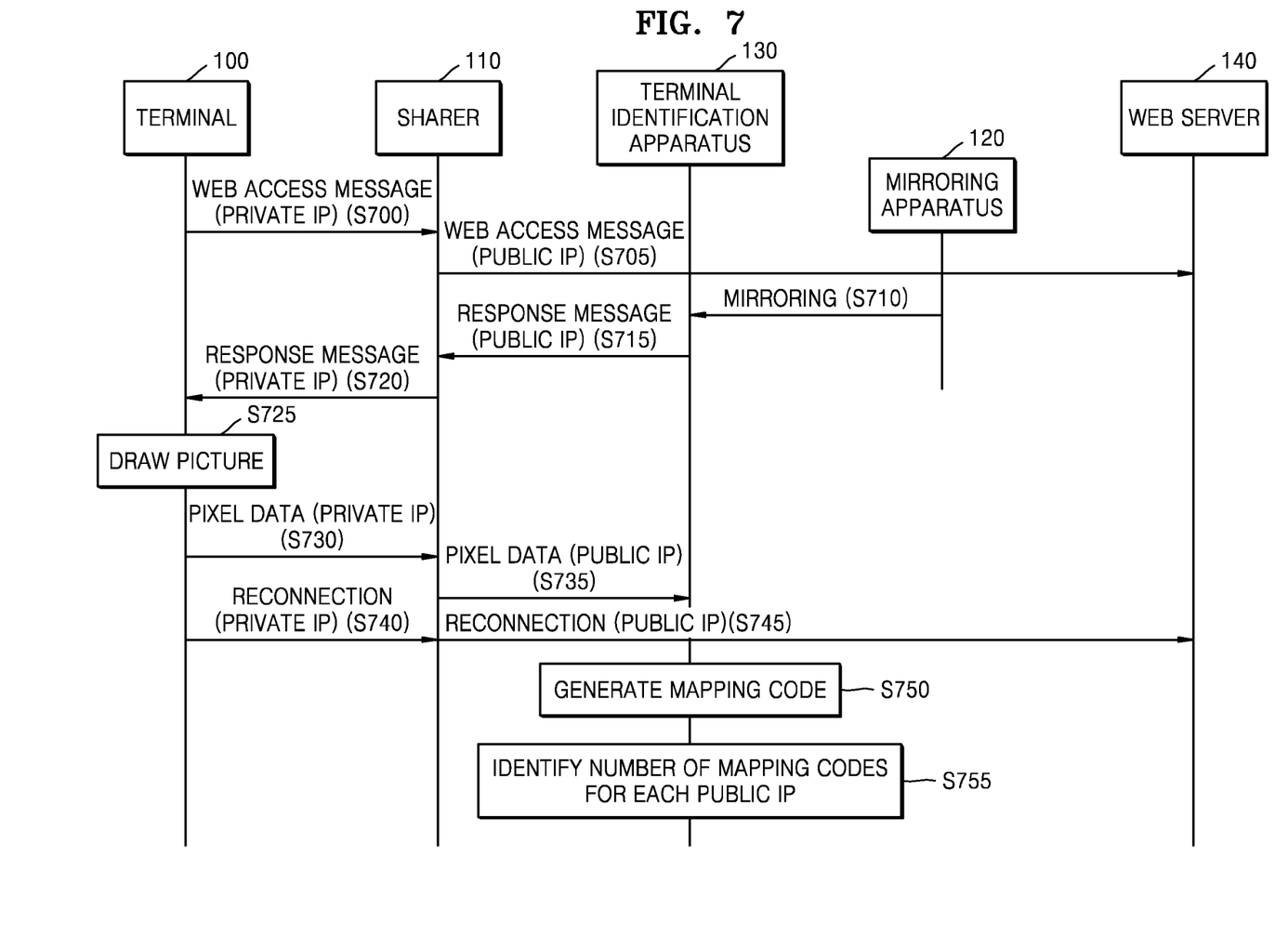
FIG. 7 is a diagram showing an example of a terminal identification method according to the present disclosure.

FIG. 7 is a diagram showing an example of a terminal identification method according to the present disclosure.

Referring to FIG. 7, when the terminal 100 transmits a web access message (including a private IP address) to access the web server (operation S700), the sharer 110 converts the private IP address of the web access message to a public IP address and thus transmits the same to the web server 140 (operation S705). In this regard, the mirroring apparatus 120 mirrors the web access message transmitted to the web server and provides the same to the terminal identification apparatus 130 (operation S710).

The terminal identification apparatus 130 receiving the web access message generates a response message including a picture drawing command and transmits the response message to the terminal (operation S715). In this regard, the terminal identification apparatus 130 may know only the public IP address of the sharer 110 included in the web access message but not the private IP address of the corresponding terminal 100. Accordingly, the response message is transmitted to the sharer 110 first (operation S715), and the sharer 110 converts the public IP address of the received response message to the private IP address of the corresponding terminal 100 and thus transmits the same to the terminal 100 (operation S720). In this regard, the response message is not a message transmitted by the web server 140 that the terminal 100 originally intends to access but a message falsely generated and transmitted by the terminal identification apparatus 130 prior to the web server 140.

The terminal 100 receiving the response message executes a predetermined command included in the response message. For example, the response message may include a picture drawing command and a reconnection command. The picture drawing command of the response message may include a detailed command regarding a place and a size at which certain text or image is to be drawn on a screen. For example, the response message may include a command for drawing the image as shown in FIG. 2. The response message may be written using client-side script.

The terminal 100 drives a picture drawing tool according to the picture drawing command and draws an image on a certain area of the screen via the picture drawing tool (operation S725). The image may be transparently drawn in some embodiments. As another example, the terminal may not draw a picture but extract an image common to terminals as an image for terminal identification.

The terminal 100 may extract pixel data for an image for terminal identification, which is drawn or displayed on a certain area of the screen and transmits the pixel data to the terminal identification apparatus 130 (operations S730 and S735). In some embodiments, the terminal 100 may transmit binary data for the image on a certain area of the screen to the terminal identification apparatus 130 as-is, or may transmit pixel data having binary data converted into a character string to the terminal identification apparatus 130.

In addition, according to the reconnection command included in the response message, the terminal 100 transmits the web access message to the web server 140 for reconnection to the web server 140 originally intended to access (operations S740 and S745).

The terminal identification apparatus 130 may store pixel data received from the terminal 100 as-is and may manage the pixel data. However, as shown in FIGS. 5 and 6, since pixel data is long and inconvenient to manage, it is desirable for the terminal identification apparatus 130 to generate a mapping code for pixel data and store and manage the mapping code together with a public IP address or user identification information (operation S750). As an example, the terminal identification apparatus 130 uses a hash value as the mapping code for pixel data. That is, a hash value for pixel data is generated and is used as a mapping code.

The terminal identification apparatus 130 may identify the number of terminals within a private network by identifying the number of different mapping codes for each public IP address or for each user identification information (operation S755).

When the same image is displayed on each terminal, portions of pixels are generally different from each other. However, in case pixels of the image displayed on two terminals are completely the same, environment information such as hardware information or software information of a terminal may be additionally used for terminal determination.

To this end, the terminal identification apparatus 130 may additionally obtain environment information of the terminal. Examples of the environment information may include a color depth, a time zone, a central processing unit (CPU) type (for example, x86, x64, Alpha, PPC, etc.) a platform (for example, Windows, Mac, Linux, etc.), a user-agent, a language type, SessionStorage, LocalStorage, IndexedDB, plug-in, etc. In addition, hardware or software related information of the terminal may be used as the environment information. The terminal identification apparatus 130 may obtain environment information of the terminal from the web access message, or when receiving pixel data from the terminal, may also receive environment information and obtain the environment information.

In addition, the terminal identification apparatus 130 generates a mapping code for pixel data and environment information. For example, the terminal identification apparatus 130 uses a hash value generated with pixel data of a character string and environment information as an input of a hash function as a mapping code. Accordingly, when environment information is different and pixel data is identical, mapping codes different from each other may be generated, and thus, terminals may be identified.

In another embodiment, a plurality of browsers of one terminal may be used. When an image for terminal identification is drawn by using a picture drawing tool of a browser, pixels of the image for terminal identification may vary according to a type of the browser. For example, when Explorer and Chrome are used on one terminal, there may be a pixel difference between an image drawn by Explorer and an image drawn by Chrome.

In order to address this issue, the terminal identification apparatus 130 additionally implements the configuration of identifying the number of mapping codes for each browser type to identify the number of mapping codes for each public IP address or for each user identification information.

For example, the terminal identification apparatus is assumed to identify a mapping code as shown in the table below through the method shown in FIG. 7.

TABLE 1

| User identification information (or public IP address) | Browser type | Mapping code (hash value) | Number |
|---|---|---|---|
| A | Explorer | 123456 | 1 |
| A | Explorer | 123457 | 2 |
| A | Explorer | 123458 | 3 |
| A | Chrome | 234567 | 1 |
| A | Chrome | 234568 | 2 |
| A | Firefox | 345678 | 1 |

In table 1, from among mapping codes corresponding to the same user identification information (that is, the same public IP address), three different mapping codes exist with respect to Explorer, two different mapping codes exist with respect to Chrome, and one mapping code exists with respect to Firefox. Accordingly, the terminal identification apparatus 130 may count the number of different mapping codes for each browser and identify 3, which is the largest number, and thus, may identify that the number of terminals within a private network is at least three.

Figure 8:
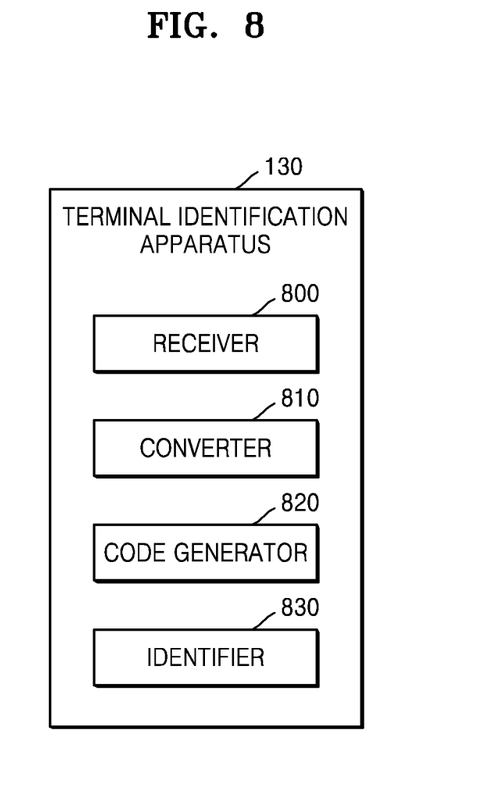
FIG. 8 is a diagram showing configurations of a terminal identification apparatus according to an embodiment of the present disclosure.

FIG. 8 is a diagram showing configurations of the terminal identification apparatus 130 according to an embodiment of the present disclosure.

Referring to FIG. 8, the terminal identification apparatus 130 includes a receiver 800, a converter 810, a code generator 820, and an identifier 830.

The receiver 800 receives pixel data for an area of a screen of a terminal. In some embodiments, the receiver 800 may further receive environment information in addition to pixel data. As an example, the receiver 800 may intercept a web access message of the terminal, transmit a false response message including a predetermined command to the terminal, and receive pixel data. In addition, various methods for receiving pixel data from a terminal may be applied.

When the pixel data is binary data, the converter 810 converts the binary pixel data into a character string. For example, the converter 810 may convert binary number into an ASCII character string by using Base 64. When the receiver 800 receives pixel data composed of a character string, the converter 810 may be omitted.

The code generator 820 generates a mapping code for pixel data of the character string. The code generator 820 may generate the mapping code by using only the pixel data, or may generate the mapping code by using the pixel data and the environment information together. As an example, a hash value may be used as the mapping code.

The identifier 830 identifies the number of different mapping codes for each public IP address or for each user identification information. However, in case the terminal uses a plurality of browsers, the identifier 830 additionally identifies the number of different mapping codes for each browser.

The present disclosure may be embodied as computer-readable codes on a computer-readable recording medium. The computer-readable recording medium includes any storage device that may store data which may be read by a computer system. Examples of the computer-readable recording medium include read-only memory (ROM), random-access memory (RAM), CD-ROM, magnetic tapes, floppy disks, and optical data storage devices. The computer-readable recording medium may be distributed over network-coupled computer systems so that the computer-readable codes are stored and executed in a distributed fashion.

While the present disclosure has been particularly shown and described with reference to exemplary embodiments thereof, it will be understood that various changes in form and details may be made therein without departing from the spirit and scope of the following claims. The exemplary embodiments should be considered in a descriptive sense only and not for purposes of limitation. Therefore, the scope of the present disclosure is defined not by the above description but by the appended claims, and all differences within the scope will be construed as being included in the present disclosure.

What is claimed is:

1. A terminal identification method for identifying a number of terminals within a private network sharing one public Internet Protocol (IP) address by a terminal identification apparatus, wherein the terminal identification apparatus is outside the private network, the method comprising:
    receiving a web access message which is transmitted from the private network to a web server;
    transmitting a response message comprising a picture drawing command to a terminal of the private network in response to the web access message, wherein the picture drawing command includes a place and a size of an image to be drawn on a screen, wherein the image is common to each terminal within the private network;
    obtaining pixel data from the terminal which receives the response message, wherein the pixel data is data of pixels of the image drawn on a screen of the terminal, wherein the pixel data is different from one another according to a type of hardware or a type of software of each terminal;
    generating hash value for the pixel data as a mapping code, and storing the mapping code; and
    identifying a number of different mapping codes for the IP address as the number of terminals sharing the public IP address.

2. The terminal identification method of claim 1, wherein the generating of the mapping code comprises:
    converting the pixel data, which is binary, into a character string; and
    generating a hash value for the character string.

3. The terminal identification method of claim 1, wherein the pixel data comprises data for each pixel of the image drawn or displayed on the area of the screen of the terminal, wherein a transparency degree of the image is set to 100%.

4. The terminal identification method of claim 1, wherein the response message comprises the picture drawing command and a reconnection command with respect to a server that the terminal originally intends to access.

5. The terminal identification method of claim 1, wherein at least one attribute from among a line color, a font location, a font size, a font type, a font color, a figure shape, a figure size, and a figure background color is applied to the drawn image.

6. The terminal identification method of claim 1, further comprising obtaining environment information comprising hardware information or software information of the terminal,
    wherein the generating of the mapping code comprises generating a mapping code for the pixel data and the environment information.

7. The terminal identification method of claim 1, further comprising:
    obtaining browser type information of the terminal; and
    identifying a number of different mapping codes within a same browser for each public IP address or for each user identification information.

8. The terminal identification method of claim 1, further comprising:
    transmitting, by the terminal, a request for the a web access message via a browser;
    receiving, by the terminal, the a response message comprising a picture drawing command in response to the request for the web access;
    extracting, by the terminal, the pixel data of the image drawn or displayed on an area of a screen according to the picture drawing command, and transmitting, by the terminal, the pixel data.

9. The terminal identification method of claim 8, wherein the pixel data comprises binary pixel data for the image drawn on the area of the screen, or character string data for the binary pixel data.

10. The terminal identification method of claim 8, wherein the response message comprises the picture drawing command and a reconnection command with respect to a server that the terminal originally intends to access,
    wherein the terminal identification method further comprises reconnecting, by the terminal, to the web server according to the reconnection command.

11. A computer-readable non-transitory recording medium having recorded thereon a program for performing the method of claim 1.

* * * * *